US010515246B2

(12) United States Patent
Fernandez-Dorado et al.

(10) Patent No.: US 10,515,246 B2
(45) Date of Patent: Dec. 24, 2019

(54) CODE READER WITH EXTENDED READING RANGE

(71) Applicant: Cognex Corporation, Natick, MA (US)

(72) Inventors: Pepe Fernandez-Dorado, Aachen (DE); Saul Sanz Rodriguez, Aachen (DE); Laurens Nunnink, Simpelveld (NL); Richard Reuter, Wurselen (DE)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/455,406

(22) Filed: Mar. 10, 2017

(65) Prior Publication Data
US 2019/0018993 A1 Jan. 17, 2019

(51) Int. Cl.
  G06K 7/10 (2006.01)
  G06K 7/14 (2006.01)
  G06K 19/06 (2006.01)

(52) U.S. Cl.
  CPC .......... *G06K 7/10811* (2013.01); *G06K 7/10* (2013.01); *G06K 7/10722* (2013.01); *G06K 7/10742* (2013.01); *G06K 7/10831* (2013.01); *G06K 7/10881* (2013.01); *G06K 7/14* (2013.01); *G06K 7/1478* (2013.01); *G06K 19/06028* (2013.01)

(58) Field of Classification Search
  USPC .................................................. 235/462.24
  See application file for complete search history.

(56) References Cited

U.S. PATENT DOCUMENTS

| 5,354,977 | A | * | 10/1994 | Roustaei | G03F 7/705 235/462.11 |
| 7,793,840 | B2 | * | 9/2010 | Vinogradov | G06K 7/10702 235/454 |
| 2006/0056042 | A1 | * | 3/2006 | Kim | G02B 3/14 359/666 |
| 2016/0321514 | A1 | | 11/2016 | Kahle | |

\* cited by examiner

*Primary Examiner* — Rafferty D Kelly
(74) *Attorney, Agent, or Firm* — Quarles & Brady LLP

(57) ABSTRACT

An image based code reader comprises an image sensor. The image sensor is configured to acquire an image of a code. Additionally, the image based code reader includes a lens configured to project an image scene including the code onto the image sensor, the lens comprising a variable optical power that controls a focus distance of the image based code reader. The image based code reader further includes a processor operatively coupled to the image sensor and the lens. The processor is configured to acquire the image of the code using only pixels located within a region of interest of the sensor, and a size of the region of interest is selected based on the focus distance of the reader.

20 Claims, 13 Drawing Sheets

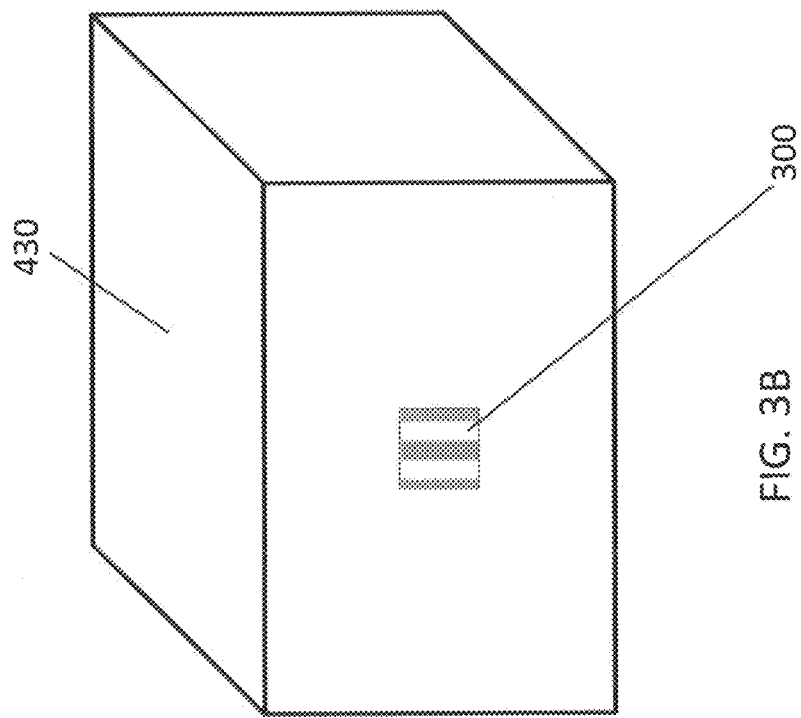
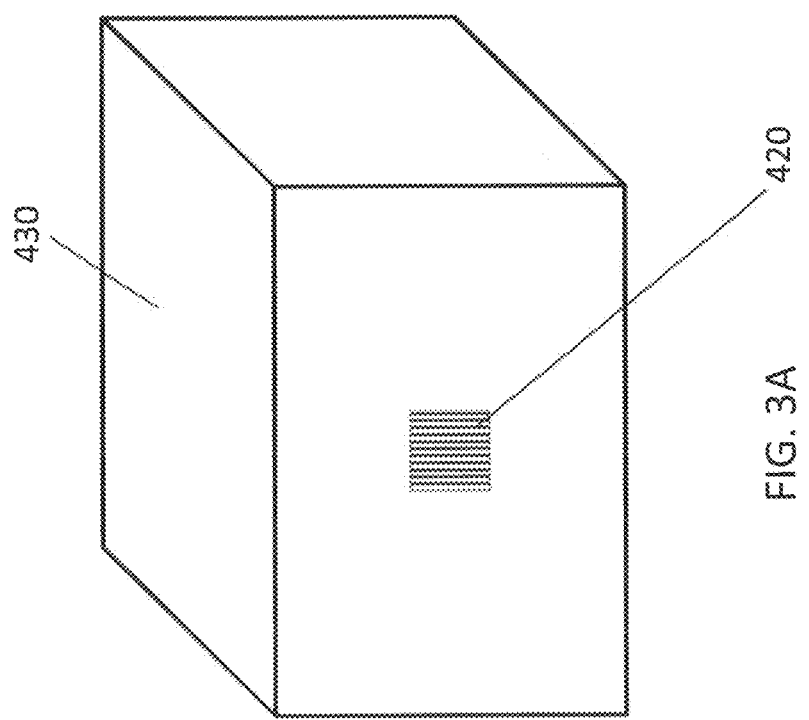

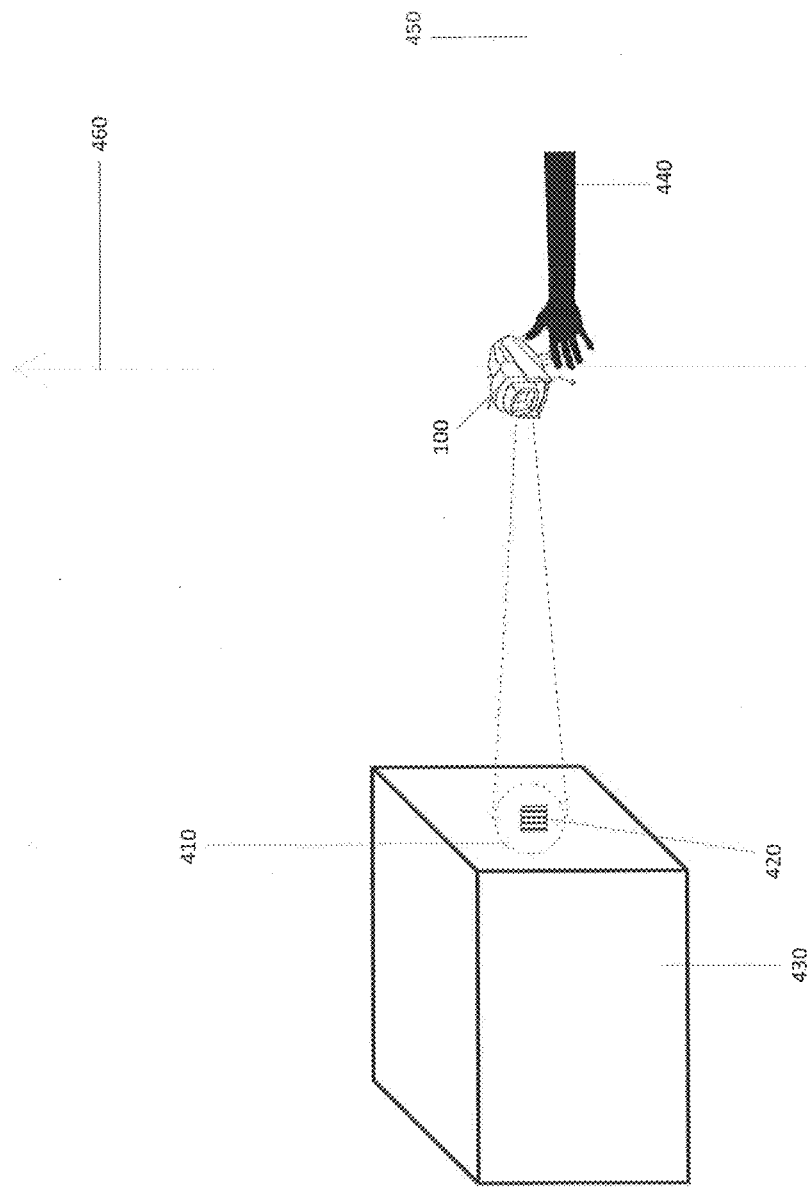

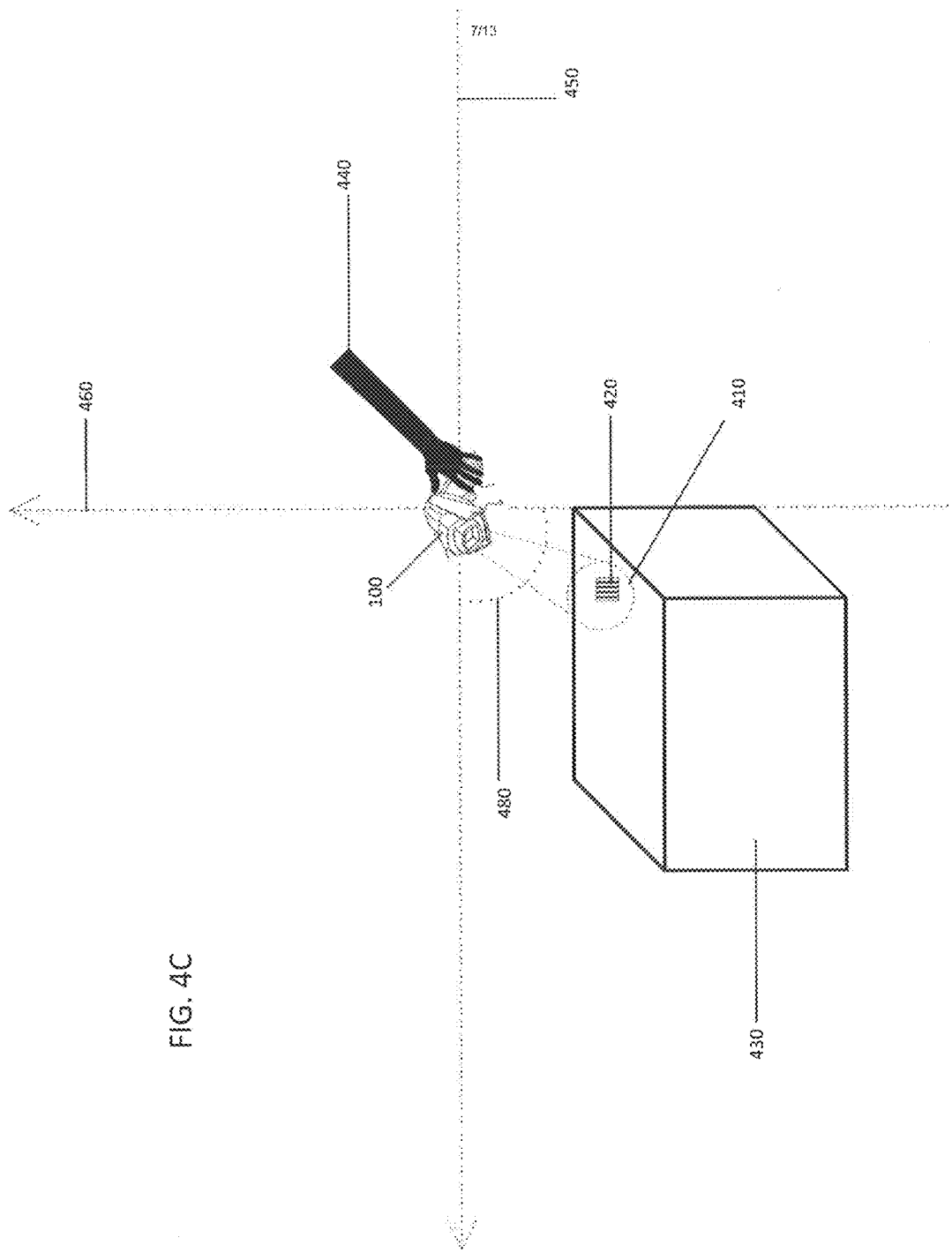

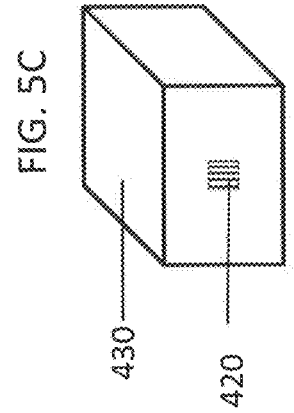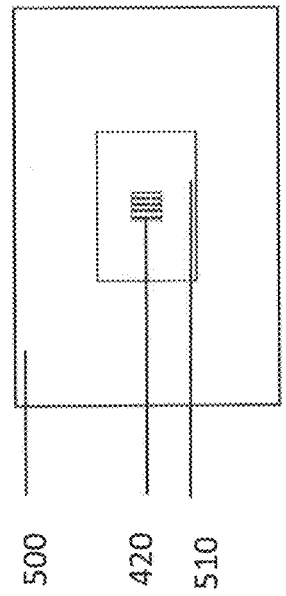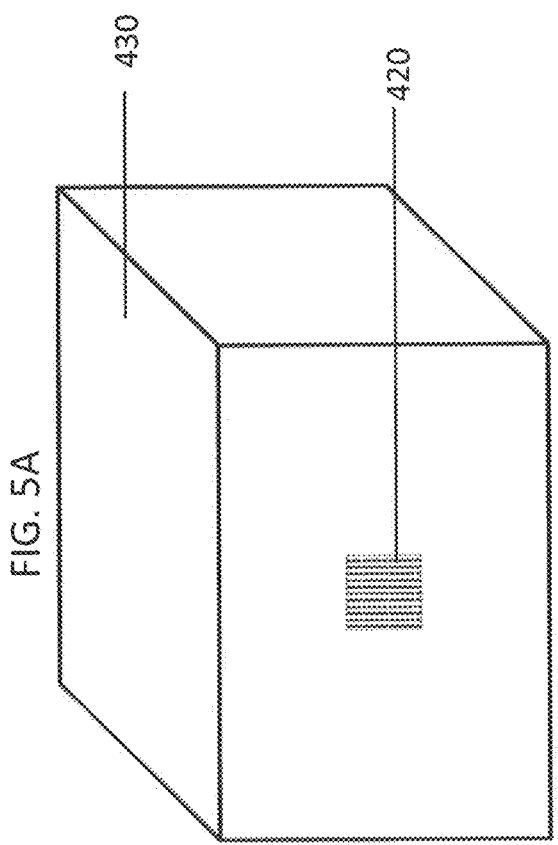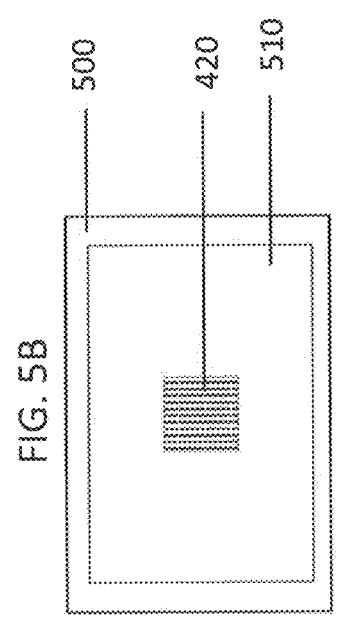

CODE READER WITH EXTENDED READING RANGE

CROSS-REFERENCE TO RELATED APPLICATIONS

Not Applicable

BACKGROUND

The present technology relates to imaging systems and methods for reading and decoding symbols, and more specifically, to imaging systems and methods for reading symbols within an extended reading range.

Imaging systems use image acquisition devices that include image sensors to deliver information on a viewed subject. The system then interprets this information according to a variety of algorithms to perform a programmed decision-making and/or identification function. For an image to be most effectively acquired by a sensor in the visible, and near-visible light range, the subject is typically illuminated.

Symbology reading (also commonly termed "barcode" scanning) using an image sensor, entails the aiming of an image acquisition system including optics (lenses) and a sensor (CMOS camera, CCD, etc.) at a location on an object that contains a symbol (a "barcode" for example), and acquiring an image of that symbol. The symbol contains a set of predetermined patterns that represent an ordered group of characters or shapes from which an attached data processor (for example a microcomputer) can derive useful information about the object (e.g. its serial number, type, model, price, etc.). Symbols/barcodes are available in a variety of shapes and sizes. Two of the most commonly employed symbol types used in marking and identifying objects are the so-called one-dimensional barcode, consisting of a sequence of bars and spaces of varying width, and the so-called two-dimensional barcode consisting of a two-dimensional array of dots or rectangles.

Code readers typically have a limited range in which they are able to accurately read and decode an image. There are significant challenges to overcome when attempting to broaden the reading range: obtaining a sharp image over a long range, sufficient resolution at large distances, a sufficiently large field of view at small distances, and sufficient lighting to prevent blur. Additionally, there are significant challenges associated with achieving illumination that is perceived by the user as continuous. Using a conventional image formation system makes it difficult to overcome these challenges. This is especially true for handheld devices, where the available space and electrical power are limited.

A need exists for improved systems and methods for the acquisition and decoding of symbols, and in particular, to overcome the shortcomings relating to the reading range of conventional image formation systems.

BRIEF SUMMARY OF THE INVENTION

An image based code reader is disclosed. The image based code reader comprises an image sensor, and the image sensor is configured to acquire an image of a code. The image based code reader further comprises a lens configured to project an image scene including the code onto the image sensor. The lens comprises a variable optical power that controls a focus distance of the image based code reader. The image based code reader includes a processor operatively coupled to the image sensor and the lens, and the processor is configured to acquire the image of the code using only pixels located within a region of interest of the sensor. Further, a size of the region of interest is selected based on the focus distance of the reader.

An image based code reader is disclosed. The image based code reader comprises an image sensor, and the image sensor is configured to acquire an image of a code. The image based code reader includes a lens configured to project an image scene including the code onto the image sensor. The lens comprises a variable optical power that controls a focus distance of the image based code reader. The image based code reader additionally includes a processor operatively coupled to the image sensor and the lens. The processor is configured to acquire the image of the code with the image sensor at an exposure time and/or a gain setting. The exposure time and/or the gain setting is selected based on the focus distance of the reader.

A handheld image based code reader is disclosed. The handheld image based code reader comprises an image sensor, and the image sensor is configured to acquire an image of a code. The handheld image based code reader includes a lens configured to project an image scene including the code onto the image sensor. The lens comprises a variable optical power that controls a focus distance of the image based code reader. The handheld image based code reader further includes an orientation sensor configured to determine an angle of the reader relative to an external frame of reference. A processor is operatively coupled to the image sensor, the lens and the orientation sensor, and the processor is configured to receive an orientation signal from the orientation sensor. The orientation signal is representative of the angle, and the processor is configured to control the variable optical power of the lens based on the angle.

A method of reading image based code using an image based code reader is disclosed. The image based code reader comprises an image sensor, a lens, and a processor. The method comprises selecting an operating mode from a plurality of operating modes: the plurality of operating modes includes at least a first mode and a second mode. The method further includes setting an optical power of the lens, using the processor, and based on the operating mode. Additionally, the method includes defining, based on the operating mode, a region of interest of the sensor, and acquiring an image of a code using only pixels of the image sensor located within the region of interest.

A method of reading image based code using an image based code reader is disclosed. The image based code reader comprises an image sensor, a lens, and a processor. The method comprises setting an optical power of the lens using the processor. Further, the method includes determining a focus distance of the image based code reader and defining, based on the focus distance of the reader, an exposure time and/or a gain setting. The method additionally includes acquiring an image of a code with the image sensor at the exposure time and/or the gain setting.

A method of reading image based code using a handheld image based code reader is disclosed. The image based code reader comprises an image sensor, an orientation sensor, a lens, and a processor. The method comprises determining an angle of the reader relative to an external frame of reference using the orientation sensor. The method additionally includes sending an orientation signal representative of the angle to the processor and determining an optical power of the lens from the orientation signal. The method includes setting the optical power of the lens using the processor.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 3A shows a code type in accordance with the present disclosure.

FIG. 3B shows a code type in accordance with the present disclosure.

FIG. 4A shows an orientation sensor aspect in accordance with the present disclosure.

FIG. 4C shows an orientation sensor aspect in accordance with the present disclosure.

FIG. 5A shows a region of interest size aspect in accordance with the present disclosure.

FIG. 5B shows a region of interest size aspect in accordance with the present disclosure.

FIG. 5C shows a region of interest size aspect in accordance with the present disclosure.

FIG. 5D shows a region of interest size aspect in accordance with the present disclosure.

Figure 1A:
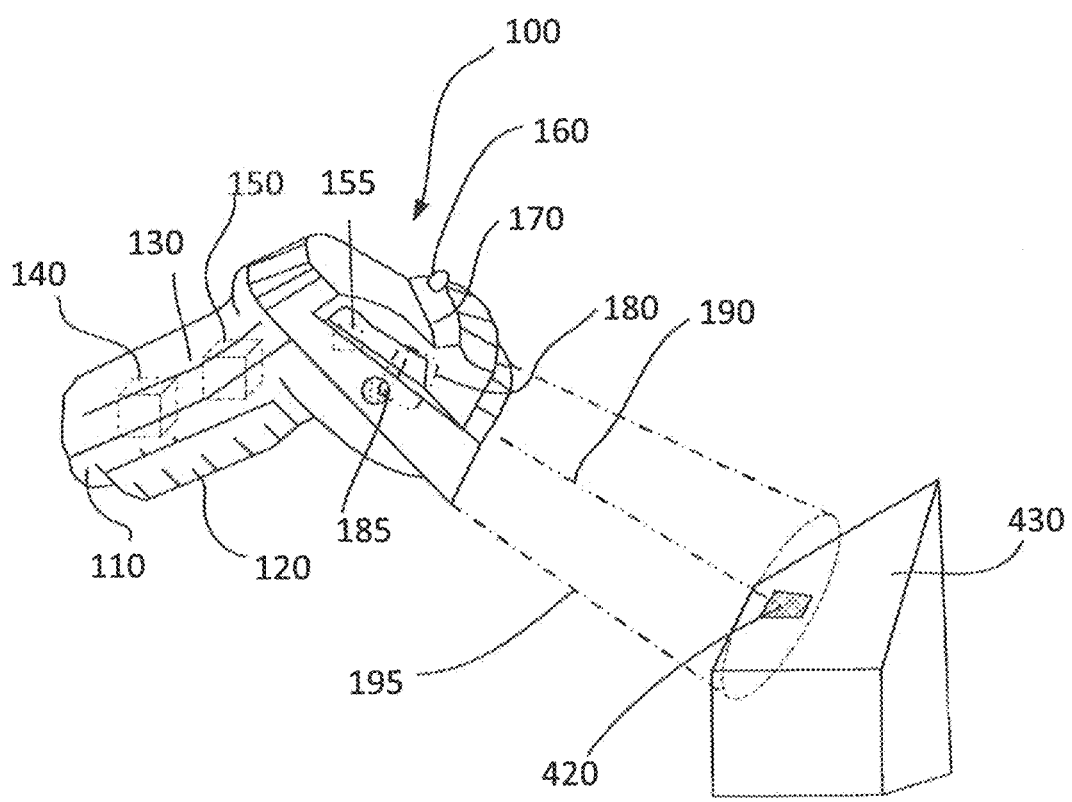
FIG. 1A is a perspective view of an image based code reader in accordance with the present disclosure.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE INVENTION

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter can be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" can include one or more processors and memories and/or one or more programmable hardware elements. As used herein, the term "processor" is intended to include any of types of processors, CPUs, microcontrollers, digital signal processors, or other devices capable of executing software instructions.

As used herein, the term "three-dimensional field of view" refers to the three-dimensional portion of an image scene that is sampled by an imaging device. As used herein, the term "two-dimensional field of view" refers to the two-dimensional portion of the projection of the image scene onto an image sensor. The three-dimensional field of view and the two-dimensional field of view are related to one another. Reducing the three-dimensional field of view in a dimension that is projected onto the image sensor (i.e., a dimension that is not parallel to the optical axis) will correspondingly reduce the two-dimensional field of view, and vice versa.

In one non-limiting example, the systems and methods disclosed can be implemented in a code reader with a specific range of 0.3 meters to 15 meters. This reading range can utilize a liquid lens for improved focus distance control. The first mode can be defined by the focus distance range of 0.3 meters to 1.5 meters. The second mode can then be defined by the focus distance range of 1.5 meters to 15 meters. The systems and methods can be extended to any additional ranges. For example, various ranges can be replaced with other ranges throughout this disclosure. Where a range of 0.3 meters to 15 meters is recited, ranges of 0.3 meters to 8 meters, 0.3 meters to 12 meters, and 0.5 meters to 10 meters are also expressly contemplated. Where a range of 0.3 meters to 1.5 meters is recited, other distances are contemplated. Where a range of 1.5 meters to 15 meters is recited, other distances are contemplated. Where two modes are recited, three, four, five, or more modes can be utilized.

FIG. 1A is a perspective view of an image based code reader 100 in accordance with the present disclosure. Image based code reader 100 can include a housing 130 having a grip section 110, a body/barrel section 170 with a trigger 120, a user input device 185, optics/lenses 180, an orientation sensor 150, a processor 140, an image sensor 155, and one or more LED banks 160. Each of the processor 140, orientation sensor 150, image sensor 155, and lens 180 can be mounted in or otherwise supported by housing 130. Processor 140 can be linked to each of orientation sensor 150, lens 180, image sensor 155, and LED banks 160.

Figure 1B:
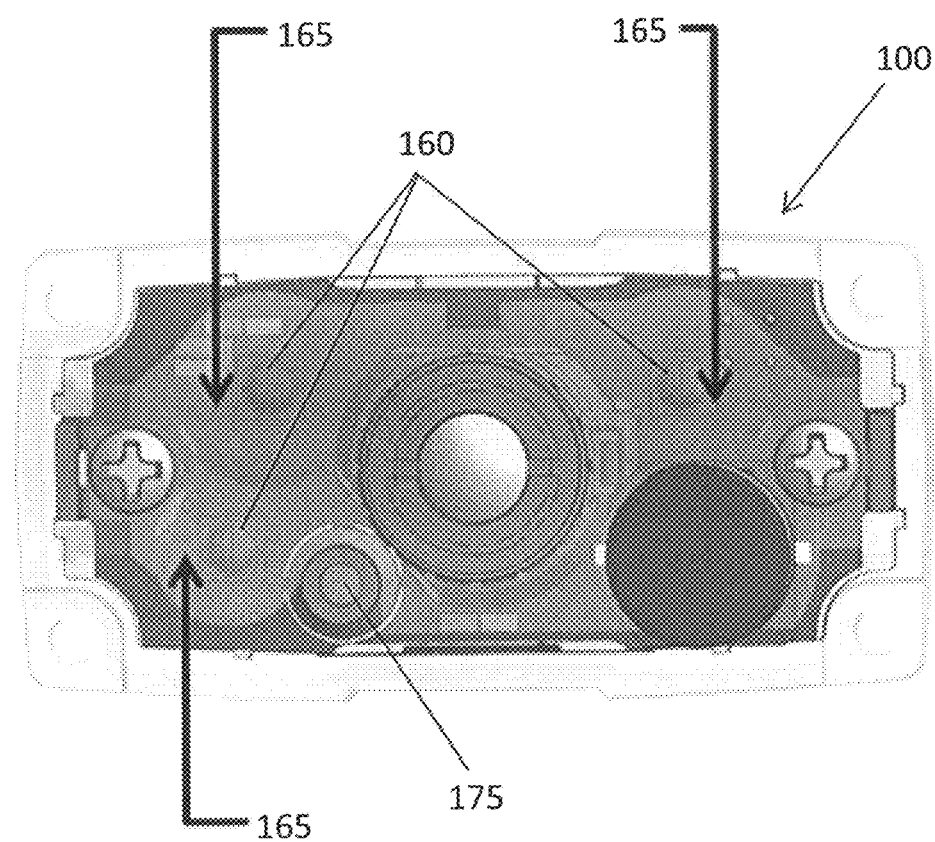
FIG. 1B is a front view of an image based code reader in accordance with the present disclosure.

FIG. 1B is a front view of the image based code reader 100 shown in FIG. 1A. In one aspect, the LED banks 160 can provide illumination substantially parallel to a field of view (FOV) axis 190 to provide a bright field illumination source. The FOV axis 190 can be illuminated via an illuminated beam 175. The LED banks 160 can define at least two illuminations. Each of the at least two illuminations are configured with a different emission angle, and the at least two illuminations can be selected depending on the focus distance of the reader. A plurality of lenses 165 can be used with the LED banks 160 to configure the focus distance of the reader.

Referring again to FIG. 1A, in one non-limiting aspect, a first bank of LEDs can have an emission angle wide enough to illuminate the FOV 195 at near distances, and a second bank of LEDs can generate a narrow angle, collimated beam optimized for far distances, wherein collimated, as used herein, refers to light with rays that are substantially parallel, and therefore will spread minimally as the light propagates. In certain cases, the first bank of LEDs can have an emission angle of at least 30 to 50 degrees.

A collimated beam can be defined as having a small angle with an emission angle less than 20 degrees. Both illuminations can be alternately activated with an LED-on time of 5 ms and a constant high frequency, which is perceived by a typical user as a continuous-on illumination. In certain situations it can be beneficial to first activate the first bank of LEDs for the specified LED-on time, then activate the second bank of LEDs for the specified LED-on time. This specific order therefore first illuminates near distances, followed by the illumination of far distances. In certain situations it can be beneficial to have a frequency within the range of 40 Hz to 60 Hz. Instead of utilizing LED banks, a 2 dimensional array of LEDs can be used and optically coupled with a collimation lens, with the size of the activated center area of this array defining the emission angle of the illumination beam.

Lens 180 focuses a FOV 195 to generate data comprising an image of items located within the FOV 195. FOV 195 is centered along a FOV axis 190. Thus, when the FOV 195 is directed toward a code 420 applied on an item 430 and code reader 100 is activated to generate an image, an image including the code 420 can be obtained. In certain cases, the lens 180 includes a liquid lens. As used herein, a "liquid lens" refers to a lens module that has an electronically controllable variable focus distance.

Still referring to FIG. 1A, FOV axis 190 extends from the code 420 to the image sensor within image based code reader 100. FOV axis 190 length can vary between 0.3 meters and 15 meters. First mode can be utilized for the focus distance range of 0.3 meters to 1.5 meters. Second mode can be utilized for the focus distance range of 1.5 meters to 15 meters. Orientation sensor 150 can determine which mode is used first when scanning the code 420. The user can set the mode of the image based code reader 100 via user input device 185. User input device 185 can be a switch or a touch screen. A user can select an operating mode from a plurality of operating modes via user input device 185. In certain situations, it can be beneficial to control selection via user input when using mobile terminals. The user input can include a touch screen with first and second selection buttons. Alternatively, the selection of operating mode can be controlled based on available distance information. The selection of operating mode can also be controlled by alternately switching between operating modes.

Figure 2B:
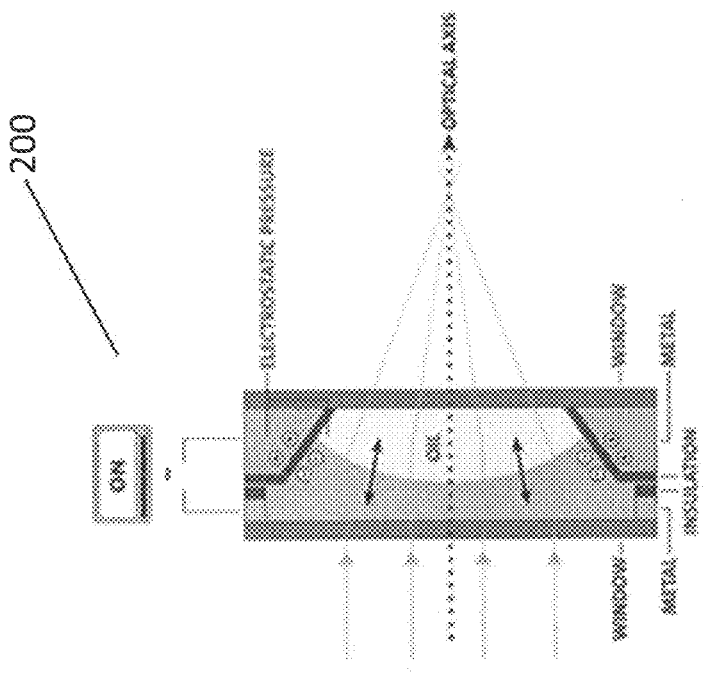
FIG. 2B shows an example liquid lens in accordance with the present disclosure.
Figure 2A:
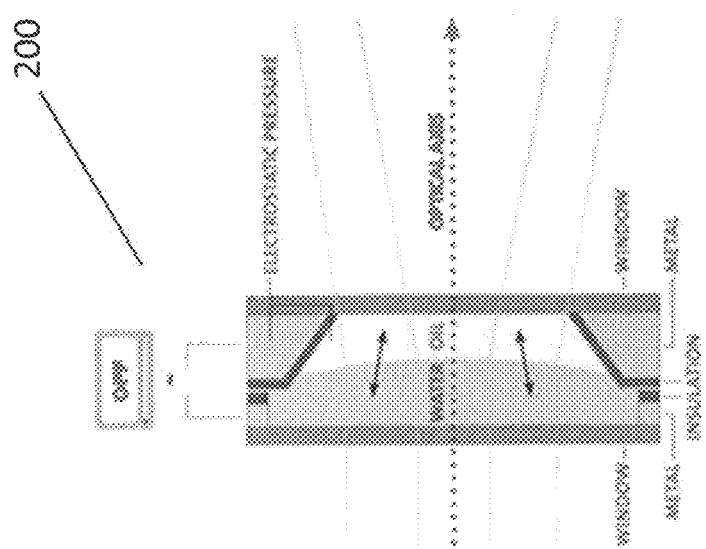
FIG. 2A shows an example liquid lens in accordance with the present disclosure.

FIGS. 2A and 2B depict a liquid lens in accordance with the present disclosure. A liquid lens 200 uses two iso-density liquids, oil as an insulator and water as a conductor. The variation of voltage can lead to a change of curvature of the liquid-liquid interface, which in turn can lead to a change of the focal length of the installed optical lens. The liquid lens external shape can be fixed, with only the internal liquids changing shape. FIG. 2A shows a non-limiting example liquid lens 200 that has a low level of voltage. FIG. 2B shows a non-limiting example liquid lens 200 that has a comparatively higher level of voltage. Another non-limiting example of a liquid lens is produced by the Swiss company Optotune.

In one non-limiting aspect, the code can be paper based or retro-reflective. For a paper based code, the required exposure time and gain values can increase at larger distances. For a retro-reflective code, the required exposure time and gain values may not be as high at larger distances. This is due to the high reflectivity of light inherent in retro-reflective code. In first mode and second mode different parameters can be used, respectively, to optimize the brightness control of the image.

FIGS. 3A and 3B show different types of code in accordance with the present disclosure. A first code 420 can be applied on an item 430. The first code 420 can be, for example, a paper code. A second code 300 can also be applied on an item 430. The second code 300 can be, for example, a retro-reflective code. Image based code reader 100 can be configured to acquire an image of first code 420, and also can be configured to acquire an image of second code 300.

Figure 4B:
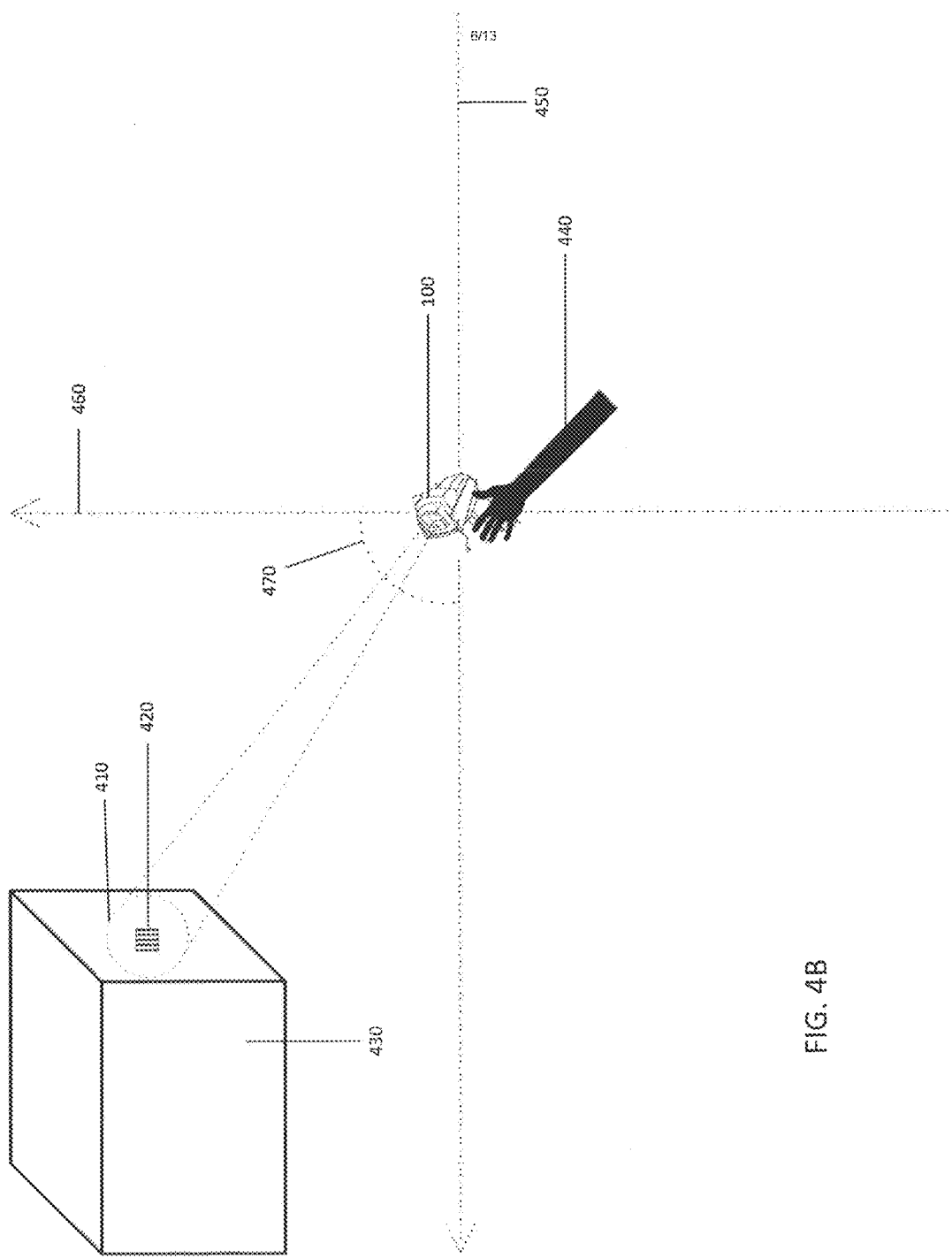
FIG. 4B shows an orientation sensor aspect in accordance with the present disclosure.

FIGS. 4A-4C demonstrate an orientation sensor 150 aspect in accordance with the present disclosure. The orientation sensor 150 can be utilized to select between modes. In one non-limiting example, the orientation sensor will be used to select the initial focus distance or initial mode for which an image is captured. If the code is unable to be found within the captured image, then the orientation sensor can select a different focus distance or different mode before capturing a second image. For the purposes of this disclosure, x-axis 450 corresponds to a substantially horizontal direction and y-axis 460 corresponds to a substantially vertical direction. FIG. 4A depicts an image based code reader 100 on a horizontal plane with respect to x-axis 450. User 440 can aim the image based code reader 100 at code 420 which can be applied on an item 430. Field of view 410 can be determined by image based code reader 100. The distance from image based code reader 100 to code 420 can be from 0.3 meters to 15 meters. Alternatively, the distance from image based code reader 100 to code 420 can be within a different specified range.

FIG. 4B shows an image based code reader 100 at an angle between 0 degrees and +90 degrees with respect to x-axis 450. User 440 can aim the image based code reader 100 at code 420 which can be applied on an item 430. Field of view 410 can be determined by image based code reader 100. The distance from image based code reader 100 to code 420 can be from 0.5 meters to 10 meters. The image based code reader 100 can utilize an orientation signal from the orientation sensor 150, where the orientation signal can be representative of the angle. The mode of the image based code reader 100 can be set based upon the orientation signal. When image based code reader 100 is oriented between 0 degrees and +90 degrees with respect to x-axis 450, for example, the image based code reader 100 can be in a mode configured for reading a code 420 from 1.5 meters to 10 meters away. This mode can be a second mode (this mode can be called, for example, far mode, and can be used for attempting to decode code candidates at a longer distance). Alternatively, image based code reader 100 can be in a mode with a different specified reading range.

FIG. 4C shows an image based code reader 100 at an angle between 0 degrees and −90 degrees with respect to x-axis 450. User 440 can aim the image based code reader 100 at code 420 which can be applied on an item 430. Field of view 410 can be determined by image based code reader 100. The distance from image based code reader 100 to code 420 can, for example, be from 0.3 meters to 15 meters. The image based code reader 100 can utilize an orientation signal from the orientation sensor, where the orientation signal can be representative of the angle. The mode of the image based code reader 100 can be set based upon the orientation signal. When image based code reader 100 is oriented between 0 degrees and −90 degrees with respect to x-axis 450, for example, the image based code reader 100 can be in a mode configured for reading a code 420 from 0.3 meters to 1.5 meters away. This mode can be a first mode (this mode can be called, for example, near mode, and can be used for attempting to decode code candidates at a shorter distance). Alternatively, image based code reader 100 can be in a mode with a different specified reading range.

In certain cases, the image based code reader 100 can be configured for reading a code 420 from 0.3 to 1.5 meters away (or in first mode or near mode) when the image based code reader 100 is oriented at an angle between −90 degrees and −15 degrees with respect to x-axis 450, including but not limited to, an angle between −85 degrees and −80 degrees, between −80 degrees and −75 degrees, between −75 degrees and −70 degrees, between −70 degrees and −65 degrees, between −65 degrees and −60 degrees, between −60 degrees and −55 degrees, between −55 degrees and −50 degrees, between −50 degrees and −45 degrees, between −45 degrees and −40 degrees, between −40 degrees and −35 degrees, between −35 degrees and −30 degrees, between −30 degrees and −25 degrees, between −25 degrees and −20 degrees, between −20 degrees and −15 degrees, between −15 degrees and −10 degrees, between −10 degrees and −5 degrees, and between −5 degrees and 0 degrees, and combinations of the upper and lower bounds of these ranges that are not explicitly recited.

In certain cases, the image based code reader 100 can be configured for reading a code from 1.5 meters to 15 meters away (or in second mode or far mode) when the image based code reader 100 is oriented at an angle between 90 degrees and 0 degrees with respect to x-axis 450, including but not limited to, an angle between 85 degrees and 80 degrees, between 80 degrees and 75 degrees, between 75 degrees and 70 degrees, between 70 degrees and 65 degrees, between 65 degrees and 60 degrees, between 60 degrees and 55 degrees, between 55 degrees and 50 degrees, between 50 degrees and 45 degrees, between 45 degrees and 40 degrees, between 40 degrees and 35 degrees, between 35 degrees and 30 degrees, between 30 degrees and 25 degrees, between 25 degrees and 20 degrees, between 20 degrees and 15 degrees, between 15 degrees and 10 degrees, between 10 degrees and 5 degrees, and between 5 degrees and 0 degrees, and combinations of the upper and lower bounds of these ranges that are not explicitly recited.

FIGS. 5A-5D show a region of interest size aspect in accordance with the present disclosure. FIG. 5A shows code 420 which can be applied on an item 430. An image based code reader 100 can be used to read code 420. FIG. 5B depicts the projection of an image scene onto the image sensor 155, where the code 420 is projected onto a two-dimensional field of view 500 of the image sensor 155, and additionally within a region of interest 510 that makes up a percentage of the two-dimensional field of view 500. In certain cases, an image can be acquired using only pixels located within the region of interest 510. When image based code reader 100 is 0.5 meters to 3 meters from code 420, for example, the region of interest can occupy at least a predetermined percentage of the image sensor 155. In some cases, when image based code reader 100 is 0.5 meters to 3 meters from code 420, the region of interest can be the entire image sensor 155 (i.e., all of the pixels of the image sensor 155 can be used to acquire the image). The region of interest can be determined by the current mode of image based code reader 100.

FIG. 5C shows code 420 which can be applied on an item 430. An image based code reader 100 can be used to read code 420. FIG. 5D depicts code 420 within a field of view 500, and additionally within a region of interest 510. Again, in certain cases, an image can be acquired using only pixels located within the region of interest 510. When image based code reader 100 is 3 meters to 10 meters from code 420, for example, the region of interest can occupy at most the predetermined percentage of the image sensor 155. The region of interest can be determined by the current mode of image based code reader 100.

In certain cases, the predetermined percentage can be 10%, 25%, or 50%.

In yet another non-limiting aspect, the processor can implement pixel-binning and/or sub-sampling for a short focus distance. To achieve a sufficient field of view, the full image sensor can be used at near distances. In certain situation, it can be beneficial to implement 2×2 pixel-binning.

The image sensor 155 can have a resolution of, for example, 1.2 Mpixels. In certain cases, the image sensor 155 can have a resolution of 1280×800 pixels, 1280×1024 pixels, or 2592×1944 pixels.

Figure 6B:
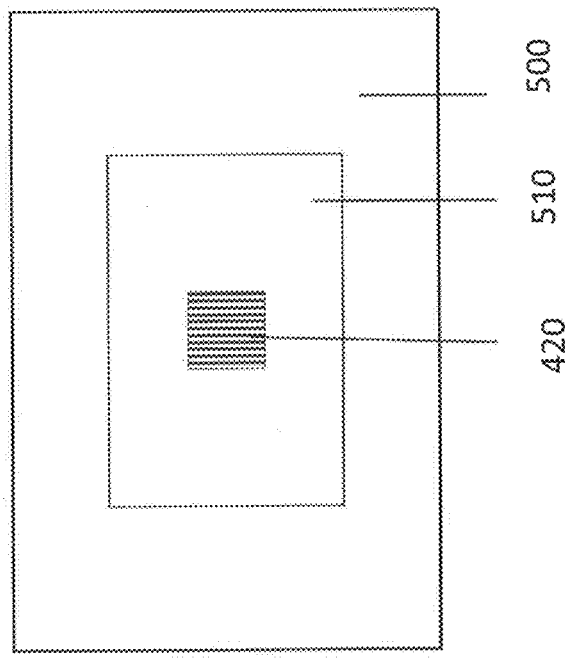
FIG. 6B shows a region of interest placement aspect in accordance with the present disclosure.
Figure 6A:
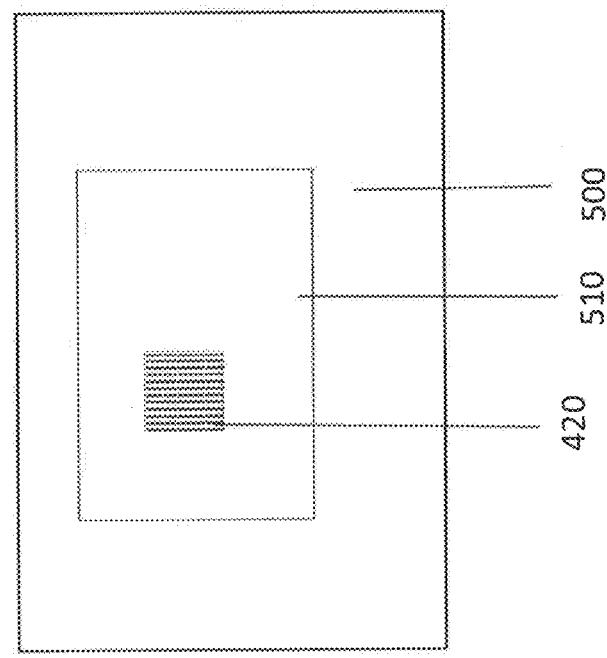
FIG. 6A shows a region of interest placement aspect in accordance with the present disclosure.

FIGS. 6A-6B show a region of interest placement aspect in accordance with the present disclosure. In certain situations, it can be beneficial to have the region of interest 510 placed in different areas within the two-dimensional field of view 500. FIG. 6A shows one example where the region of interest 510 is not centered within the two-dimensional field of view 500. The region of interest 510 can be shifted based upon where code 420 is located within two-dimensional field of view 500. The region of interest 510 can occur anywhere within the two-dimensional field of view 500. The region of interest 510 can include a center portion of the image sensor when in the second mode. At far distances, the two-dimensional field of view 500 can be much larger than required to capture the code 420. By reducing the region of interest 510, it reduces the amount of data that must be processed and the required power to illuminate the field of view 500.

FIG. 6B shows one example where the region of interest 510 is centered within the field of view 500. The region of interest 510 can be shifted based upon where code 420 is located within the two-dimensional field of view 500. As shown in FIG. 1B, in certain situations, it can be beneficial to use an illuminated beam 175 to project a dot on or near an optical axis. The projected dot can assist the user in aiming and orienting the image based code reader 100.

The processor 140 can include software that learns the tendencies of a given user and adjusts the region of interest 510 based on the given user's usage history. For example, if the software identifies that the user has historically aimed the image based code reader 100 to the right (from the user's perspective) when aiming the image based code reader 100 approximately horizontally and at long distances, then the region of interest 510 can be shifted within the two-dimensional field of view 500 to compensate for this tendency under those acquisition conditions.

Figure 7:
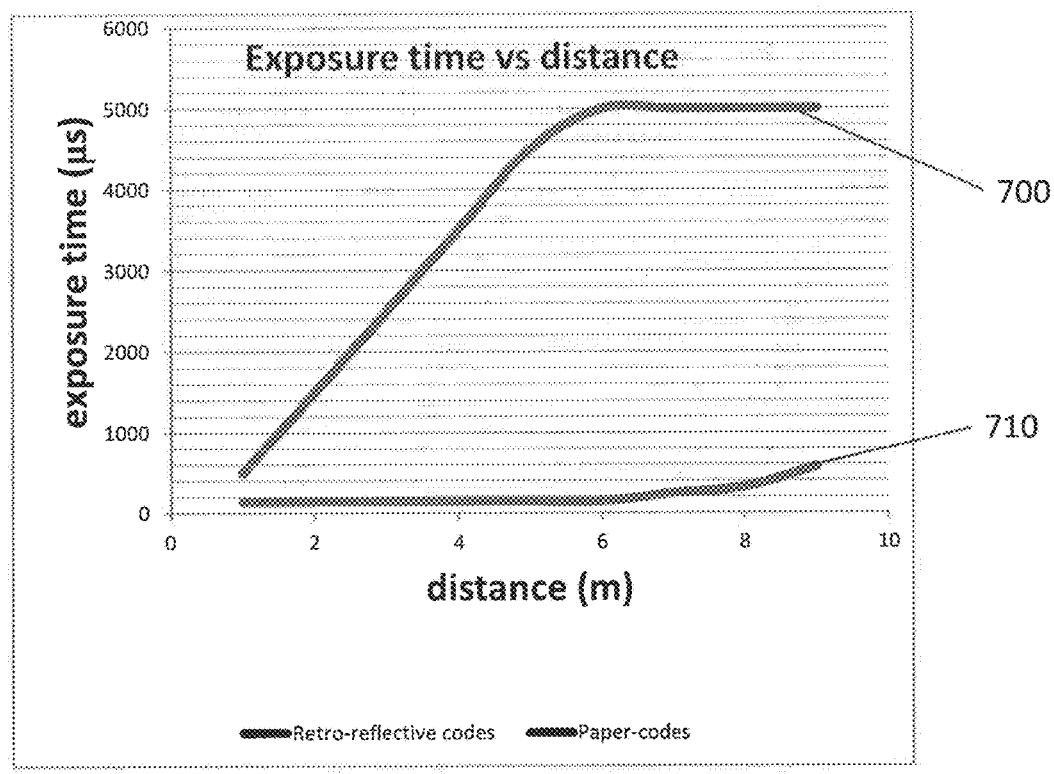
FIG. 7 is a graph of exposure time vs distance for different code types in accordance with the present disclosure.

FIG. 7 is a graph of exposure time vs distance for retro-reflective codes 710 and paper codes 700. Distance measurements indicate the distance from the code to the reader. For a paper code 700, the required exposure time and gain values can increase at larger distances. For a retro-reflective code 710, the required exposure time and gain values cannot be as high at larger distances. This is due to the high reflectivity of light inherent in retro-reflective code 710. The time to find the algorithm starts with settings close to the optimum curves for paper code 700 or retro-reflective code 710. In first and second mode, different parameters can be used to optimize the brightness control of the image.

Figure 8:
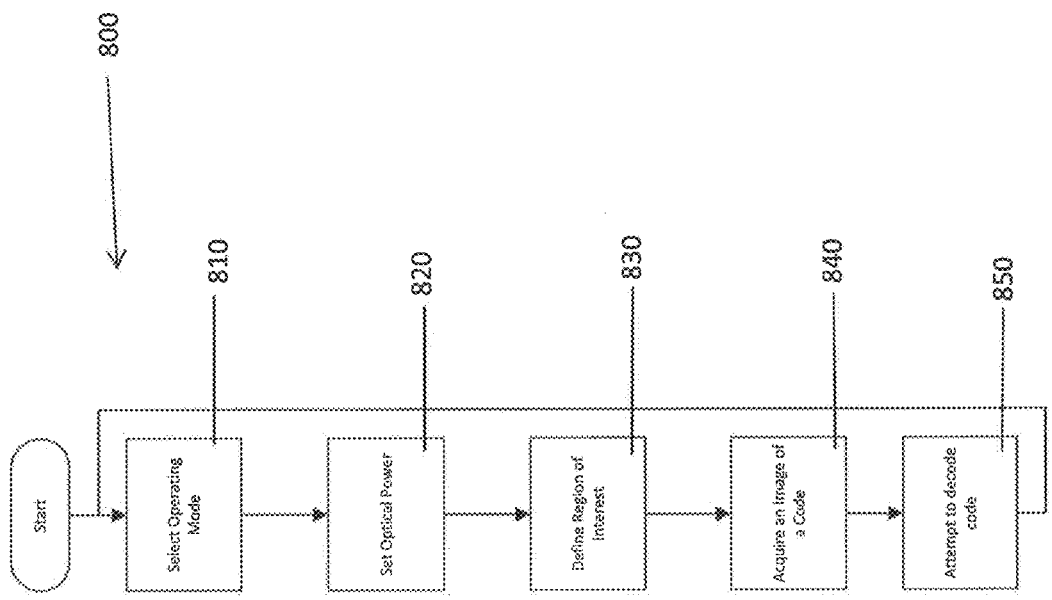
FIG. 8 is a flowchart in accordance with the present disclosure.

Referring to FIG. 8, the present disclosure provides a method 800 of reading image based code using an image based code reader. At process block 810, the method 800 can include selecting an operating mode. At process block 820, the method 800 can include setting the optical power of the lens based on the operating mode. At process block 830, the method 800 can include defining a region of interest based on the operating mode. At process block 840, the method 800 can include acquiring an image of a code. At process block 850, the method 800 can include attempting to decode the code.

Figure 9:
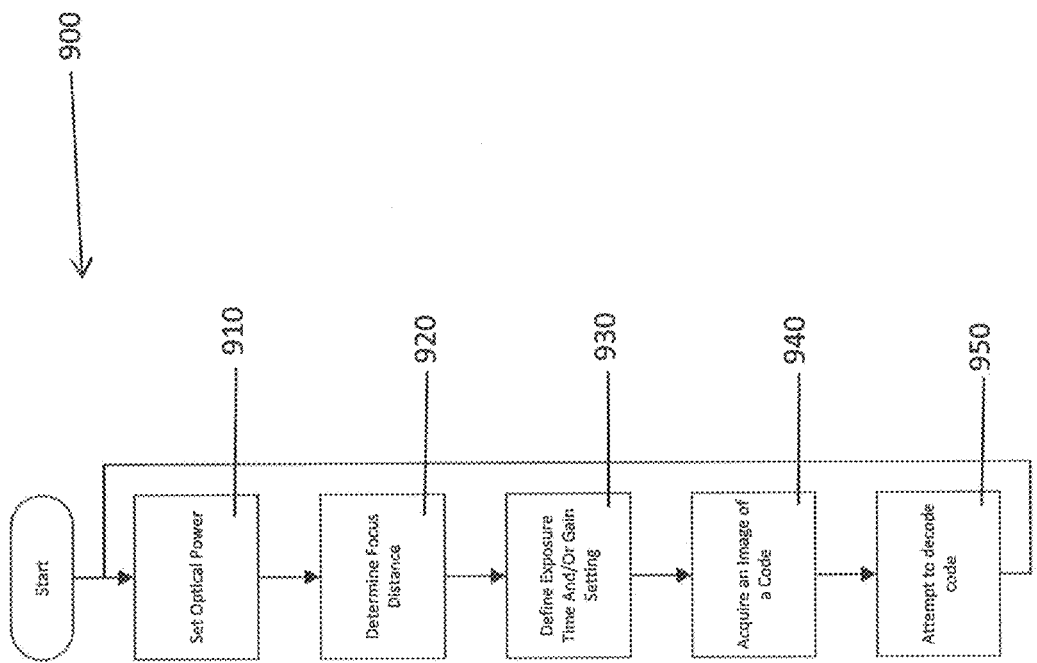
FIG. 9 is a flowchart in accordance with the present disclosure.

Referring to FIG. 9, the present disclosure provides an additional method 900 of reading image based code using an image based code reader. At process block 910, the method 900 can include setting the optical power of the lens. At process block 920, the method 900 can include determining a focus distance. At process block 930, the method 900 can include defining an exposure time and/or gain setting. At process block 940, the method 900 can include acquiring an image of a code. At process block 950, the method 900 can include attempting to decode the code.

Figure 10:
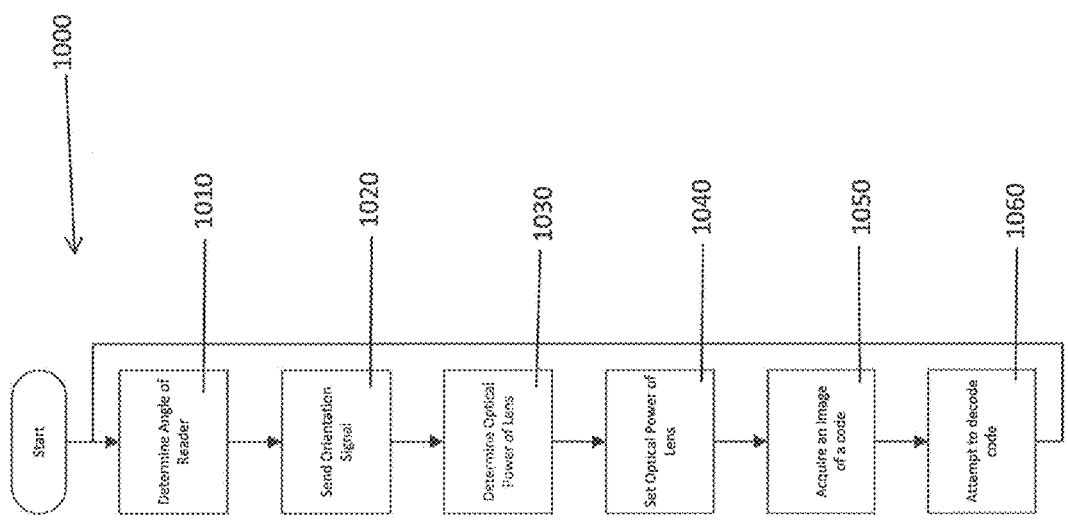
FIG. 10 is a flowchart in accordance with the present disclosure.

Referring to FIG. 10, the present disclosure provides another method 1000 of reading image based code using an image based code reader. At process block 1010, the method can include determining the angle of the reader. At process block 1020, the method can include sending the orientation signal to the processor. At process block 1030, the method can include determining the optical power of the lens based on the angle of the reader. At process block 1040, the method can include setting the optical power of the lens. At process block 1050, the method 1000 can include acquiring an image. At process block 1060, the method 1000 can include attempting to decode any code candidates located within the image.

The present disclosure includes an image based code reader comprising an image sensor, the image sensor configured to acquire an image of a code; a lens configured to project an image scene including the code onto the image sensor, the lens comprising a variable optical power that controls a focus distance of the image based code reader; a processor operatively coupled to the image sensor and the lens, the processor configured to acquire the image of the code using only pixels located within a region of interest of the sensor, wherein a size of the region of interest is selected based on the focus distance of the reader. The image based code reader can be further configured to operate in a plurality of operating modes, the processor configured to select from the plurality of operating modes. Further, the plurality of operating modes can include at least a first mode and a second mode, the first mode having a first region of interest and the second mode having a second region of interest, the first region of interest is larger than the second region of interest. Further, the second region of interest can include a center portion of the image sensor when in the second mode. Additionally, a desired operating mode can be selected from the plurality of operating modes by a user. The image based code reader can further comprise one or more illuminators configured to illuminate the image scene with light having at least two emission angles, the processor configured to select from the at least two emission angles based on the focus distance of the reader. Further, the one or more illuminators can comprise at least two banks of light emitting diodes. Additionally, the at least two emission angles can be alternately enabled with a fixed pulse duration and a fixed frequency. Additionally, the image can be captured by synchronizing an exposure time with the light having one of the at least two emission angles. Further, the exposure time can be less than an illumination time. Additionally, the processor can implement pixel-binning for when the focus distance is less than half of a maximum reading distance for a specified code size. Additionally, the processor can implement sub-sampling when the focus distance is less than half of a maximum reading distance for a specified code size. Further, the code can be paper based or retro-reflective. The processor can be configured to select the size of the region of interest. The image based code reader can further comprise a 2-dimensional LED array, wherein a center part of the LED array is activated to illuminate the code, and a size of the LED array (number of activated LEDs) is based on the focus distance of the reader, the size of the LED array defined by a number of activated LEDs.

The present disclosure includes an image based code reader comprising an image sensor, the image sensor configured to acquire an image of a code; a lens configured to project an image scene including the code onto the image sensor, the lens comprising a variable optical power that controls a focus distance of the image based code reader; and a processor operatively coupled to the image sensor and the lens, the processor configured to acquire the image of the code with the image sensor at an exposure time and/or a gain setting, wherein the exposure time and/or the gain setting is selected based on the focus distance of the reader. The image based code reader can be further configured to operate in a plurality of operating modes, the processor configured to select from the plurality of operating modes. Additionally, the plurality of operating modes can include at least a first mode and a second mode, the first mode having a first region of interest and the second mode having a second region of interest, the first region of interest is larger than the second region of interest. Further, the second region of interest can include a center portion of the image sensor when in the second mode. Additionally, a desired operating mode can be selected from the plurality of operating modes by a user. The image based code reader can further comprise one or more illuminators configured to illuminate the image scene with light having at least two emission angles, the processor configured to select from the at least two emission angles based on the focus distance of the reader. Additionally, the one or more illuminators can comprise at least two banks of light emitting diodes. Further, the at least two emission angles can be alternately enabled with a fixed pulse duration and a fixed frequency. Further, the image can be captured by synchronizing the exposure time with the light having one of the at least two emission angles. Additionally, the exposure time can be less than an illumination time. Further, the processor can implement pixel-binning for when the focus distance is less than half of a maximum reading distance for a specified code size. Additionally, the processor can implement sub-sampling when the focus distance is less than half of a maximum reading distance for a specified code size. Further, the code can be paper based or retro-reflective. Also, the processor can be configured to select the size of the region of interest. The image based code reader can further comprise a 2-dimensional LED array, wherein a center part of the LED array is activated to illuminate the code, and a size of the LED array (number of activated LEDs) is based on the focus distance of the reader, the size of the LED array defined by a number of activated LEDs.

The present disclosure includes a handheld image based code reader comprising an image sensor, the image sensor configured to acquire an image of a code; a lens configured to project an image scene including the code onto the image sensor, the lens comprising a variable optical power that controls a focus distance of the image based code reader; an orientation sensor configured to determine an angle of the reader relative to an external frame of reference; and a processor operatively coupled to the image sensor, the lens and the orientation sensor, the processor configured to receive an orientation signal from the orientation sensor, the orientation signal representative of the angle, the processor configured to control the variable optical power of the lens based on the angle. The handheld image based code reader can be further configured to operate in a plurality of operating modes, the processor configured to select from the plurality of operating modes. Additionally, the plurality of operating modes can include at least a first mode and a second mode, the first mode having a first region of interest and the second mode having a second region of interest, the first region of interest is larger than the second region of interest. Further, the second region of interest can include a center portion of the image sensor when in the second mode. Additionally, a desired operating mode can be selected from the plurality of operating modes by a user. The handheld image based code reader can further comprise one or more illuminators configured to illuminate the image scene with light having at least two emission angles, the processor configured to select from the at least two emission angles based on the focus distance of the reader. Further, the one or more illuminators can comprise at least two banks of light emitting diodes. Additionally, the at least two emission angles can be alternately enabled with a fixed pulse duration and a fixed frequency. Additionally, the image can be captured by synchronizing an exposure time with the light having one of the at least two emission angles. Further, the exposure time can be less than an illumination time. Additionally, the processor can implement pixel-binning for when the focus distance is less than half of a maximum reading distance for a specified code size. Further, the processor can implement sub-sampling when the focus distance is less than half of a maximum reading distance for a specified code size. Additionally, the code can be paper based or retro-reflective. Further, the processor can be configured to select the size of the region of interest. The handheld image based code reader can further comprise a 2-dimensional LED array, wherein a center part of the LED array is activated to illuminate the code, and a size of the LED array (number of activated LEDs) is based on the focus distance of the reader, the size of the LED array defined by a number of activated LEDs.

The present disclosure includes a method of reading image based code using an image based code reader, the image based code reader comprising an image sensor, a lens, and a processor, the method comprising selecting an operating mode from a plurality of operating modes, the plurality of operating modes including at least a first mode and a second mode; setting an optical power of the lens, using the processor, based on the operating mode; defining, based on the operating mode, a region of interest of the sensor; acquiring an image of a code using only pixels of the image sensor located within the region of interest. Additionally, the processor can select from the plurality of operating modes. The method of reading image based code using an image based code reader can further comprise the first mode having a first region of interest and the second mode having a second region of interest, the first region of interest is larger than the second region of interest. The method of reading image based code using an image based code reader can further comprise the second region of interest including a center portion of the image sensor when in the second mode. Additionally, the method of reading image based code using an image based code reader can further comprise a user selecting a desired operating mode from the plurality of operating modes. Additionally, one or more illuminators can illuminate the image scene with light having at least two emission angles, the processor selecting from the at least two emission angles based on the focus distance of the reader. Additionally, the one or more illuminators can comprise at least two banks of light emitting diodes. Further, the at least two emission angles can be alternately enabled with a fixed pulse duration and a fixed frequency. Additionally, the image can be captured by synchronizing an exposure time with the light having one of the at least two emission angles. Further, the exposure time can be less than an illumination time. The method of reading image based code using an image based code reader can further comprise the processor implementing pixel-binning for when the focus distance is less than half of a maximum reading distance for a specified code size. The method of reading image based code using an image based code reader can further comprise the processor implementing sub-sampling when the focus distance is less than half of a maximum reading distance for a specified code size. Further, the code can be paper based or retro-reflective. The method of reading image based code using an image based code reader can further comprise the processor selecting the size of the region of interest. The method of reading image based code using an image based code reader can further comprise a 2-dimensional LED array, wherein a center part of the LED array is activated to illuminate the code, and a size of the LED array (number of activated LEDs) is based on the focus distance of the reader, the size of the LED array defined by a number of activated LEDs.

The present disclosure includes a method of reading image based code using an image based code reader, the image based code reader comprising an image sensor, a lens, and a processor, the method comprising setting an optical power of the lens, using the processor; determining a focus distance of the image based code reader; defining, based on the focus distance of the reader, an exposure time and/or a gain setting; acquiring an image of a code with the image sensor at the exposure time and/or the gain setting. The method of reading image based code using an image based code reader can be further configured to operate in a plurality of operating modes, the processor selecting from the plurality of operating modes. Further, the plurality of operating modes can include at least a first mode and a second mode, the first mode having a first region of interest and the second mode having a second region of interest, the first region of interest is larger than the second region of interest. Additionally, the second region of interest can include a center portion of the image sensor when in the second mode. The method of reading image based code using an image based code reader can further comprise a user selecting a desired operating mode from the plurality of operating modes. Further, one or more illuminators can illuminate the image scene with light having at least two emission angles, the processor selecting from the at least two emission angles based on the focus distance of the reader. Additionally, the one or more illuminators can comprise at least two banks of light emitting diodes. Additionally, the at least two emission angles can be alternately enabled with a fixed pulse duration and a fixed frequency. Further, the image can be captured by synchronizing an exposure time with the light having one of the at least two emission angles. Additionally, the exposure time can be less than an illumination time. The method of reading image based code using an image based code reader can further comprise the processor implementing pixel-binning for when the focus distance is less than half of a maximum reading distance for a specified code size. The method of reading image based code using an image based code reader can further comprise the processor implementing sub-sampling when the focus distance is less than half of a maximum reading distance for a specified code size. Further, the code can be paper based or retro-reflective. The method of reading image based code using an image based code reader can further comprise the processor selecting the size of the region of interest. The method of reading image based code using an image based code reader can further comprise a 2-dimensional LED array, wherein a center part of the LED array is activated to illuminate the code, and a size of the LED array (number of activated LEDs) is based on the focus distance of the reader, the size of the LED array defined by a number of activated LEDs.

The present disclosure includes a method of reading image based code using a handheld image based code reader, the image based code reader comprising an image sensor, an orientation sensor, a lens, and a processor, the method comprising: determining an angle of the reader relative to an external frame of reference, using the orientation sensor; sending an orientation signal representative of the angle to the processor; determining an optical power of the lens from the orientation signal; setting the optical power of the lens, using the processor. The handheld image based code reader can be further configured to operate in a plurality of operating modes, the processor selecting from the plurality of operating modes. Further, the plurality of operating modes can include at least a first mode and a second mode, the first mode having a first region of interest and the second mode having a second region of interest, the first region of interest is larger than the second region of interest. Additionally, the second region of interest can include a center portion of the image sensor when in the second mode. The method of reading image based code using the handheld image based code reader can further comprise a user selecting a desired operating mode from the plurality of operating modes. Further, one or more illuminators can illuminate the image scene with light having at least two emission angles, the processor selecting from the at least two emission angles based on the focus distance of the reader. Additionally, the one or more illuminators can comprise at least two banks of light emitting diodes. Further, the at least two emission angles can be alternately enabled with a fixed pulse duration and a fixed frequency. Additionally, the image can be captured by synchronizing an exposure time with the light having one of the at least two emission angles. Further, the exposure time can be less than an illumination time. The method of reading image based code using the handheld image based code reader can further comprise the processor implementing pixel-binning for when the focus distance is less than half of a maximum reading distance for a specified code size. The method of reading image based code using the handheld image based code reader can further comprise the processor implementing sub-sampling when the focus distance is less than half of a maximum reading distance for a specified code size. Further, the code can be paper based or retro-reflective. The method of reading image based code using the handheld image based code reader can further comprise the processor selecting the size of the region of interest. The method of reading image based code using the handheld image based code reader can further comprise a 2-dimensional LED array, wherein a center part of the LED array is activated to illuminate the code, and a size of the LED array (number of activated LEDs) is based on the focus distance of the reader, the size of the LED array defined by a number of activated LEDs.

For the avoidance of doubt, aspects of the present disclosure described with respect to the systems are applicable to the methods and aspects described with respect to the methods are applicable to the systems.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

We claim:

1. An image based code reader comprising:
    an image sensor, the image sensor configured to acquire an image of a code;
    a liquid lens configured to project an image scene including the code onto the image sensor, the liquid lens comprising a variable optical power that electronically controls a focus distance of the image based code reader; and
    a processor operatively coupled to the image sensor and the liquid lens, the processor configured to acquire the image of the code using only pixels located within a region of interest of the image sensor, wherein a size of the region of interest is selected based on the focus distance of the reader.

2. The image based code reader of claim 1, the image based code reader further configured to operate in a plurality of operating modes, the processor configured to select from the plurality of operating modes.

3. The image based code reader of claim 1, further comprising a 2-dimensional LED array, and wherein a center part of the LED array is activated to illuminate the code, and a number of activated LEDs is based on the focus distance of the reader.

4. The image based code reader of claim 2, wherein the plurality of operating modes includes at least a first mode and a second mode, the first mode having a first region of interest and the second mode having a second region of interest, the first region of interest is larger than the second region of interest.

5. The image based code reader of claim 4, wherein the second region of interest includes a center portion of the image sensor when in the second mode.

6. The image based code reader of claim 1, further comprising one or more illuminators configured to illuminate the image scene with light having at least two emission angles, the processor configured to select from the at least two emission angles based on the focus distance of the reader.

7. The image based code reader of claim 6, wherein the one or more illuminators comprise at least two banks of light emitting diodes.

8. The image based coder reader of claim 6, wherein the at least two emission angles are alternately enabled with a fixed pulse duration and a fixed frequency.

9. The image based code reader of claim 6, wherein the image is captured by synchronizing an exposure time with a light having one of the at least two emission angles.

10. The image based code reader of claim 1, wherein the processor implements one of pixel-binning or sub-sampling for when the focus distance is less than half of a maximum reading distance for a specified code size.

11. The image based code reader of claim 1, wherein the processor is configured to select the size of the region of interest.

12. A method of reading image based code using an image based code reader, the image based code reader comprising an image sensor, a liquid lens, and a processor, the method comprising:
    selecting an operating mode from a plurality of operating modes, the plurality of operating modes including at least a first mode and a second mode;
    electronically setting an optical power of the liquid lens, using the processor, based on the operating mode;
    defining, based on the operating mode, a region of interest of the image sensor; and
    acquiring an image of a code using only pixels of the image sensor located within the region of interest.

13. The method of claim 12, further comprising one or more illuminators configured to illuminate an image scene with light having at least two emission angles, the processor configured to select from the at least two emission angles based on a focus distance of the reader.

14. The method of claim 13, further comprising alternately enabling the at least two emission angles with a fixed pulse duration and a fixed frequency.

15. The method of claim 14, wherein acquiring the image further comprises synchronizing an exposure time with the light having one of the at least two emission angles.

16. The method of claim 15, wherein the exposure time is less than an illumination time.

17. A method of reading image based code using a handheld image based code reader, the handheld image based code reader comprising an image sensor, an orientation sensor, a liquid lens, and a processor, the method comprising:
    determining an angle of the reader relative to an external frame of reference, using the orientation sensor;
    sending an orientation signal representative of the angle to the processor;
    determining an optical power of the liquid lens from the orientation signal; and
    electronically setting the optical power of the liquid lens, using the processor.

18. The method of reading image based code using a handheld image based code reader of claim 17, further comprising operating in a plurality of operating modes, the processor selecting from the plurality of operating modes.

19. The method of reading image based code using a handheld image based code reader of claim 18, wherein the plurality of operating modes includes at least a first mode and a second mode, the first mode having a first mode region of interest that is larger than a second mode region of interest of the second mode.

20. The method of reading image based code using a handheld image based code reader of claim 19, further comprising selecting the first mode based on the orientation signal.

* * * * *